(12) United States Patent
Heo

(10) Patent No.: US 12,216,201 B2
(45) Date of Patent: Feb. 4, 2025

(54) RADAR CONTROL DEVICE AND METHOD

(71) Applicant: HL KLEMOVE CORP., Incheon (KR)

(72) Inventor: OhCheol Heo, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 281 days.

(21) Appl. No.: 17/703,911

(22) Filed: Mar. 24, 2022

(65) Prior Publication Data
US 2022/0308207 A1  Sep. 29, 2022

(30) Foreign Application Priority Data

Mar. 26, 2021 (KR) .................. 10-2021-0039499

(51) Int. Cl.
*G01S 13/931* (2020.01)
*G01S 13/86* (2006.01)

(52) U.S. Cl.
CPC ............ *G01S 13/931* (2013.01); *G01S 13/86* (2013.01); *G01S 2013/9316* (2020.01)

(58) Field of Classification Search
CPC ................. G01S 13/931; G01S 13/86; G01S 2013/9316; G01S 13/42; G01S 7/2923; G01S 2013/9321; B60W 40/02; B60W 2420/408
See application file for complete search history.

(56) References Cited

U.S. PATENT DOCUMENTS 5,598,163 A * 1/1997 Cornic .................. G01S 13/426
342/107
2017/0363738 A1* 12/2017 Kaino .................... G01S 13/584

OTHER PUBLICATIONS

"Grid-Based DBSCAN for Clustering Extended Objects in Radar Data" by D. Kellner, J. Klappstein, and K. Dietmayer. 2012 Intelligent Vehicles Symposium Alcala de Hernares, Spain, Jun. 3-7, 2012 (Year: 2012).*
"Millimetre wave radar imaging of mining vehicles" by G. Brooker, J. Martinez, and R. Hennessey. 7th European Radar Conference, Publ Sep. 1, 2010 (Year: 2010).*
"Predicting Millimeter Wave Radar Spectra for Autonomous Navigation" by E.Jose, M. Adams, J.S. Mullane, and N.M. Patrikalakis. IEEE Sensors Journal, vol. 10, No. May 5, 2010 (Year: 2010).*
"Radar image acquisition and interpretation for automotive applications" U. Meis and R. Schneider. IEEE IV 2003 Intelligent Vehicles Symposium pp. 328-332 (Year: 2003).*

* cited by examiner

*Primary Examiner* — Michael V Kerrigan
*Assistant Examiner* — Tanya C Sienko
(74) *Attorney, Agent, or Firm* — WOMBLE BOND DICKINSON (US) LLP

(57) ABSTRACT

The embodiments of the present disclosure relate to a radar control device and method. Specifically, a radar control device according to the present disclosure may include a receiver for receiving vehicle driving information for a host vehicle from a radar, an APS determiner for determining an angular power spectrum (APS) for a predetermined frequency based on the vehicle driving information if an object is detected in the vehicle driving information, and an object determiner for determining a position of a measurement value based on the determined APS, and determine whether there are a plurality of objects based on the position of the measurement value.

16 Claims, 13 Drawing Sheets

Region 1 APS

Region 2 APS

FIG. 7

| | 1 Target | | 2 Target | |
|---|---|---|---|---|
| a < y1 < b<br>a < y2 < b<br>y1 ≈ y2 | y1 < a<br>y2 < a<br>y1 < y2 | y1 > b<br>y2 > b<br>y1 > y2 | y1 ≈ a<br>y2 < a<br>y1 > y2 | y1 ≈ b<br>y2 > b<br>y1 < y2 |

RADAR CONTROL DEVICE AND METHOD

CROSS REFERENCE TO RELATED APPLICATION

This application claims priority from Korean Patent Application No. 10-2021-0039499, filed on Mar. 26, 2021, which is hereby incorporated by reference for all purposes as if fully set forth herein.

TECHNICAL FIELD

The embodiments of the present disclosure relate to a radar control device and method for detecting multiple objects.

Recently, the number of vehicles equipped with radar is increasing. An electronic control unit of the vehicle may calculate the distance, relative speed, and angle between the host vehicle and an object around the host vehicle based on the information output from the radar mounted on the vehicle.

The vehicle equipped with a radar may provide various safety functions or convenience functions by using the distance, relative speed, and angle between the host vehicle and an object around the host vehicle.

For example, a collision avoidance function during parking and stopping, a smart cruise function or an automatic parking function while driving may be performed by accurately identifying multiple objects in front using information input from a radar mounted on a vehicle.

Since the radar mounted on the vehicle is important for performing various functions, it is required for the radar to properly determine the object in front of the vehicle. However, a detection angle of a radar mounted on a vehicle is determined by a mounting specification, and if a radar having a low function specification is mounted on a vehicle, it is difficult to detect the multiple objects.

SUMMARY

In this background, embodiments of the present disclosure provide a radar control device and method capable of detecting multiple objects by determining an angular power spectrum (APS) of a radar.

In an aspect of the present disclosure, there is provided a radar control device including a receiver for receiving vehicle driving information for a host vehicle from a radar, an APS determiner configured to determine an angular power spectrum (APS) for a predetermined frequency based on the vehicle driving information if an object is detected in the vehicle driving information, and an object determiner configured to determine a position of a measurement value based on the determined APS, and determine whether there are a plurality of objects based on the position of the measurement value.

In another aspect of the present disclosure, there is provided a radar control method including receiving vehicle driving information for a host vehicle from a radar, determining an angular power spectrum (APS) for a predetermined frequency based on the vehicle driving information if an object is detected in the vehicle driving information, and determining a position of a measurement value based on the determined APS and determining whether there are a plurality of objects based on the position of the measurement value.

According to embodiments of the radar control device and method according to the present disclosure, it is possible to determine a plurality of objects detected from a narrow angle by determining the sum of angular power spectrum (SAPS) for a predetermined time.

BRIEF DESCRIPTION OF THE DRAWINGS

FIG. 7 is a diagram for explaining classifying a plurality of objects based on SAPS according to an embodiment.

DETAILED DESCRIPTION

Figure 1:
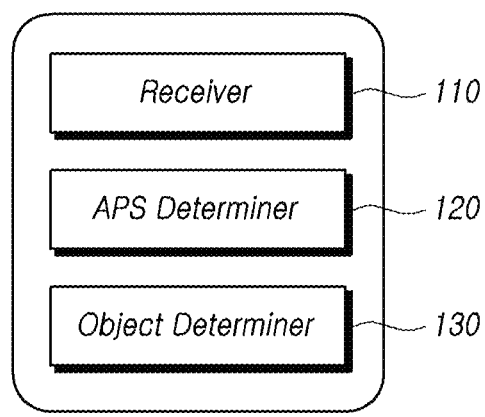
FIG. 1 is a block diagram illustrating a radar control device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described a radar control device according to an embodiment of the present disclosure with reference to the accompanying drawings.

FIG. 1 is a block diagram illustrating a radar control device 10 according to an embodiment of the present disclosure.

A radar control device 10 according to an embodiment of the present disclosure may include a receiver 110, an APS determiner 120, an object determiner 130, and the like.

The radar control device 10 according to an embodiment of the present disclosure may be an advanced driver assistance systems (ADAS) which is mounted on a host vehicle 20 and provides information to assist the driving of the host vehicle 20 or provides assistance to the driver in controlling the host vehicle 20.

Here, ADAS may refer to various types of advanced driver assistance systems, and examples of the driver assistance systems may include, for example, an autonomous emergency braking (AEB), a smart parking assistance system (SPAS), a blind spot detection (BSD) system, an adaptive cruise control (ACC) system, a lane departure warning system (LDWS), a lane keeping assistance System (LKAS), a lane change assistance system (LCAS), and the like. However, the present disclosure is not limited thereto.

Here, the host vehicle 20 may refer to a vehicle capable of moving on the ground without using a railroad or a built-in line by mounting a prime mover and rolling wheels with the power. The host vehicle 20 may be an electric vehicle which is powered by electricity, and obtains driving energy by rotating a motor with electricity accumulated in a battery rather than obtaining driving energy from combustion of fossil fuels.

The radar control device 10 may be applied to a manned vehicle controlled by a driver of the host vehicle 20, or an autonomous vehicle that automatically travels without driver intervention.

The receiver 110 may receive vehicle driving information about the host vehicle 20 from the radar.

Here, the radar may include an antenna unit, a radar transmitter and a radar receiver.

The antenna unit may include one or more transmission antennas and one or more receiving antennas, and each transmission/receiving antenna may be an array antenna in which one or more radiating elements are connected in series by a feed line, but is not limited thereto.

The antenna unit may include a plurality of transmission antennas and a plurality of receiving antennas, and may have various types of antenna array structures according to an arrangement order and an arrangement interval thereof.

The radar transmitter may provide a function of transmitting a transmission signal through a switched transmission antenna by switching the radar to one of a plurality of transmission antennas included in the antenna unit or transmitting a transmission signal through a multi-transmission channel allocated to the plurality of transmission antennas.

The radar transmitter may include an oscillator for generating a transmission signal for one transmission channel allocated to the switched transmission antenna or multi-transmission channels allocated to a plurality of transmission antennas. The oscillator may include, for example, a voltage-controlled oscillator (VCO) and an oscillator.

The radar receiver may receive a reception signal received by being reflected from an object 30 through a receiving antenna.

In addition, the radar receiver may provide a function of receiving a reception signal, which is a reflection signal of the transmission signal reflected by a target, through the switched receiving antenna by switching to one of a plurality of receiving antennas, or a function of receiving a reception signal through multi-receiving channels allocated to a plurality of receiving antennas.

The radar receiver may include a low-noise amplifier (LNA) for low-noise amplification of a reception signal received through one receiving channel allocated to the switched receiving antenna or received through a multi-receiving channel allocated to a plurality of receiving antennas, a mixer for mixing the low-noise amplified reception signal, an amplifier for amplifying the mixed reception signal, and a converter (e.g., an analog digital converter) for digitally converting the amplified reception signal to generate reception data.

The vehicle driving information received by the above-described receiver 110 may be a radar reception signal or digitally converted reception data. Here, the range of the vehicle driving information is not limited to the information on the front of the host vehicle 20, but may be determined by an image sensor mounted on the host vehicle 20. Accordingly, in the case that the host vehicle 20 is equipped with a sensor capable of detecting the surroundings of the host vehicle 20, the vehicle driving information may include information on all directions of the host vehicle 20.

Figure 2A:
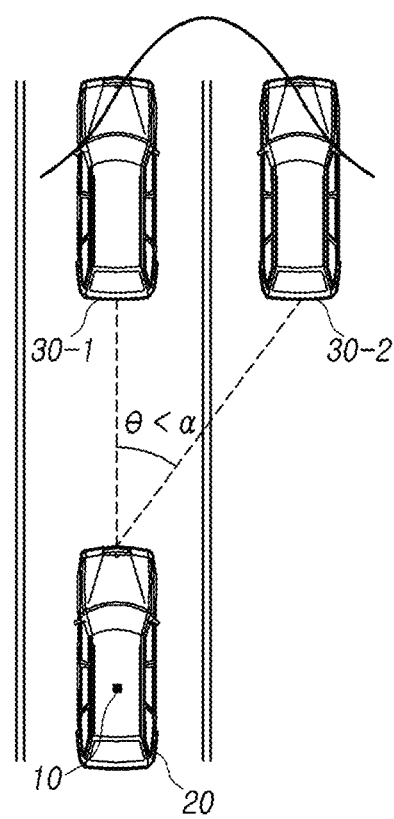
FIGS. 2A and 2B are diagrams for explaining a detection of a plurality of objects at a specific angle according to a detection angle of a radar in an embodiment.
Figure 2B:
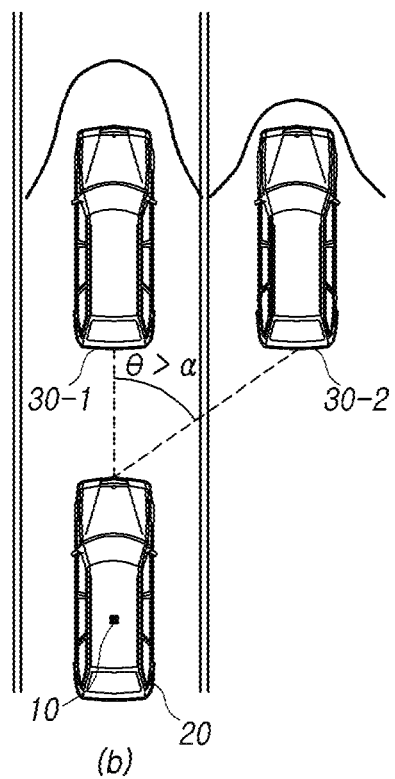

FIGS. 2A and 2B are diagrams for explaining a detection of a plurality of objects 30 at a specific angle according to a detection angle of a radar in an embodiment.

In the case that the object 30 is detected in the vehicle driving information, the APS determiner 120 may determine an angular power spectrum (APS) for a predetermined frequency based on the vehicle driving information. In addition, the APS determiner 120 may determine that the object 30 exists at the corresponding angle according to the received power value determined at the specific angle.

Referring to FIGS. 2A and 2B, in a general radar, the detection angle for detecting the plurality of objects 30 varies according to the performance of the radar mounted on the host vehicle 20. As shown in FIG. 2A, if a plurality of objects 30 are located in front, and θ, which is an angle formed by the plurality of objects 30 with respect to the front of the host vehicle 20, is smaller than α, which is the angle that distinguishes each of the plurality of objects 30 of the radar, the plurality of objects 30 may not be detected as a plurality, but may be detected as one object 30. Referring to FIG. 2, for example, in the case of FIG. 2A, since the angle formed by the plurality of objects 30 is smaller than α, which is the angle for distinguishing each of the plurality of objects 30 of the radar, the peak value of the APS is determined to be one, so that there may be determined that there is one object 30 located in the front.

Conversely, in FIG. 2B, the angle θ between the host vehicle 20 and the plurality of objects 30-1 and 30-2 is greater than α, so that the plurality of objects 30-1 and 30-2 may be separately detected. In this case, two peak values of the APS are determined at a specific angle, and thus there may be determined that there are two objects 30 located in front.

In this situation, if a high-performance radar is mounted to detect a plurality of objects 30 positioned in front, there may occur an increase in cost.

The radar control device 10 according to the present disclosure is to provide a method for detecting a plurality of objects 30 positioned at an angle that cannot detect the plurality.

Figure 3:
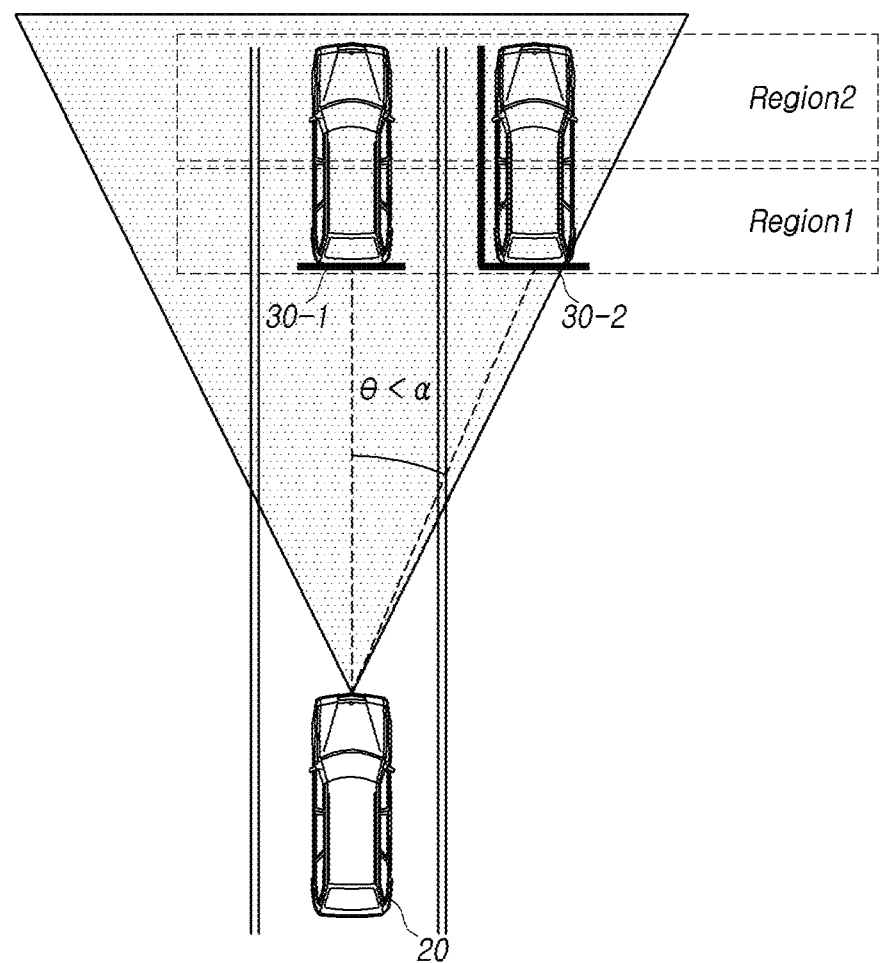
FIG. 3 is a diagram for explaining determining an APS according to a detection region according to an embodiment.

FIG. 3 is a diagram for explaining determining an APS according to a detection region according to an embodiment.

Referring to FIG. 3, an front object 30-1 located in front of the host vehicle 20 and an adjacent object 30-2 located next to the object 30-1 have different reflection areas of the radar mounted on the host vehicle 20, so that the position of the peak value of the APS may also be different.

Specifically, in the case of the front object 30-1, since the radar signal is reflected only in a first region (Region 1), that is, only the rear side of the front object 30-1, the peak value of APS may be determined around the rear position. In addition, in the case of the adjacent object 30-2, since the radar signal is reflected in both the first region and a second region (Region 2), the peak value of APS may be determined from the rear side and side surfaces of the adjacent object 30-2.

In an embodiment, the APS determiner 120 may set the first region and the second region through an image sensor mounted on the host vehicle 20. Here, the image sensor may include, for example, a camera or a lidar sensor. In another embodiment, the APS determiner 120 may set the first region and the second region based on a measurement value, and specifically, the APS determiner 120 may set a region from the measurement value calculated from the front of the host vehicle 20 to a preset distance as the first region, and set a region from the first region to the preset distance as the second region.

The above-described settings for the first region and the second region are only an example, and may vary depending on the driving environment of the host vehicle 20, and the first region and the second region may be determined through other sensors in addition to the image sensor.

Figure 4A:
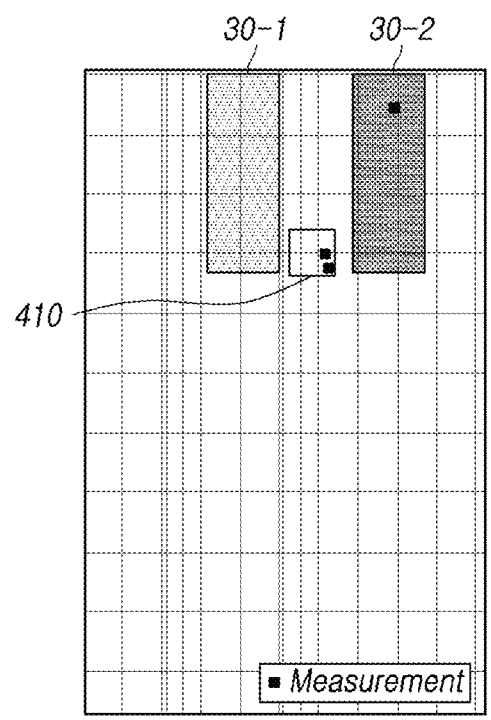
FIGS. 4A, 4B and 4C are diagrams for explaining the determination of a measurement value according to time in an embodiment.
Figure 4B:
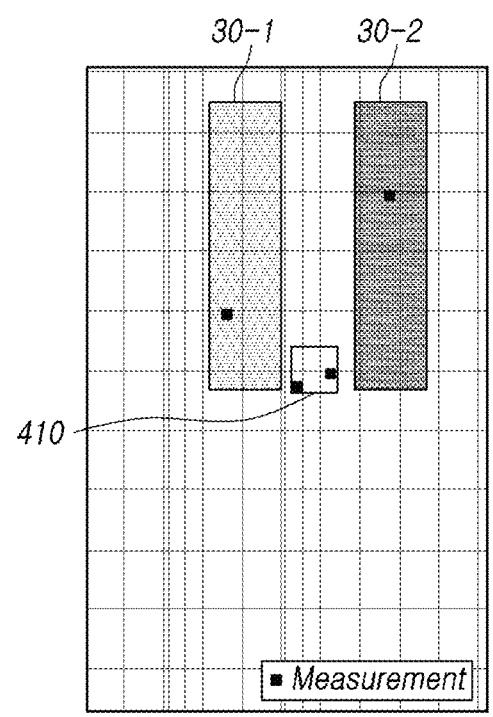
Figure 4C:
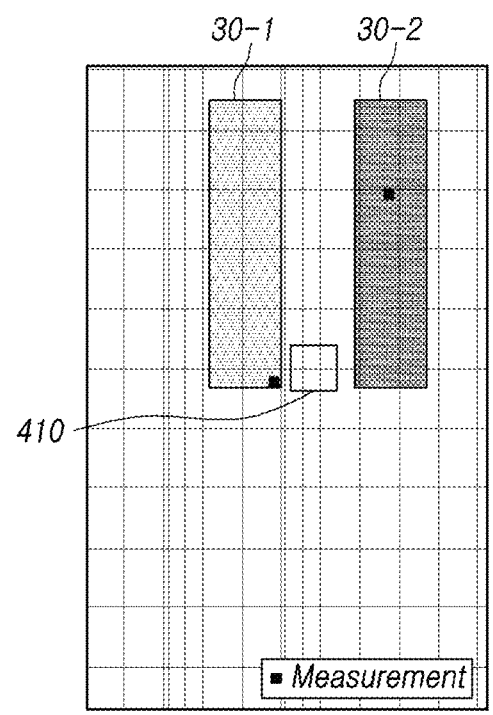

FIGS. 4A, 4B and 4C are diagrams for explaining the determination of a measurement value according to time in an embodiment.

Referring to FIGS. 4A, 4B and 4C, the radar control device 10 may set a track 410 based on measurement values determined from received information of the radar in order to track the position of the object 30. Although the measurement values may be included within the range of the track 410 set as shown in FIGS. 4A and 4B, the measurement values are not included in every radar detection period, and may not be included in the track 410 set in a specific detection period.

Specifically, in the case of FIG. 4C that is not included in the set track 410, the measurement values may be determined from the positions of the two objects 30-1 and 30-2 in front. That is, the determined measurement values may be divided into a measurement value determined in the first region and a measurement value determined in the second region of FIG. 3.

Figure 5A:
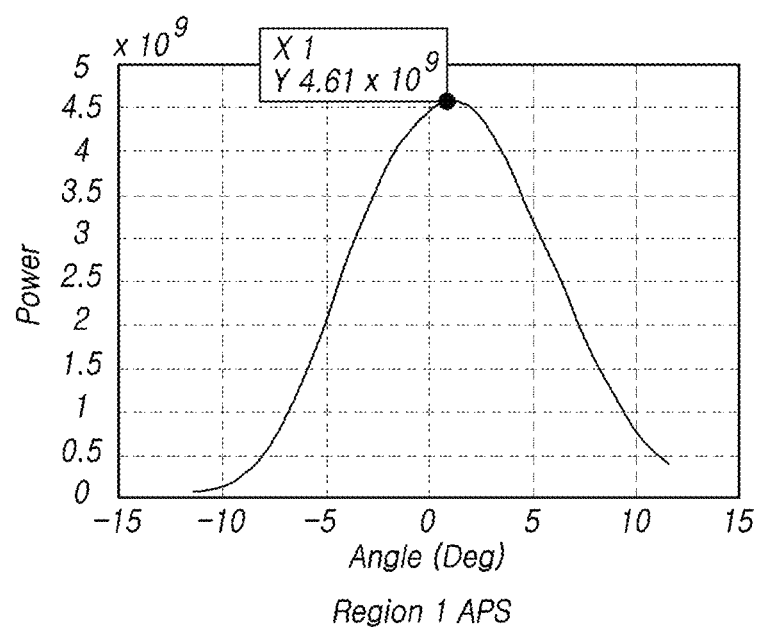
FIGS. 5A and 5B are diagrams for explaining the APS determined in a first region and a second region according to an embodiment.
Figure 5B:
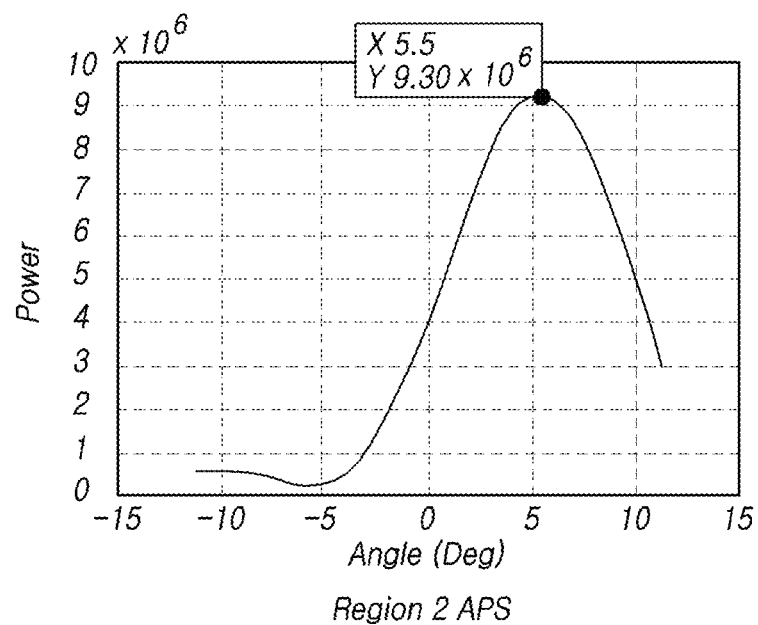

FIGS. 5A and 5B are diagrams for explaining the APS determined in a first region and a second region according to an embodiment.

The object determiner 130 may determine a position of the measurement value based on the determined APS, and may determine whether there are the multiple objects based on the position of the measurement value.

Referring to FIGS. 5A and 5B, since the APS is determined based on a reception power of the measurement values, the APS determined in the first region and the APS determined in the second region may have different positions of the peak value different from each other.

Accordingly, the object determiner 130 may determine a position corresponding to the peak value of the APS as the position of the measurement value. For example, in FIG. 5A, the object determiner 130 may determine that a position of measurement value in the first region is located in a direction of 1 degree with respect to the traveling direction of the host vehicle. As another example, in FIG. 5B, the object determiner 130 may determine that a position of measurement value in the second region is located in a direction of 5.5 degrees with respect to the traveling direction of the host vehicle.

The position of the measurement value determined by FIGS. 4A, 4B and 4C may be different from the position of the measurement value determined based on the APS. FIGS. 4A-4C explain the positions of each of a plurality of the measurement values, and FIGS. 5A and 5B is to explain that the position of the measurement value is a position corresponding to a peak value of the APS determined based on the plurality of the measurement values.

Accordingly, in a general case, if a plurality of objects are detected within an angle for separately distinguishing the plurality of objects, the APS having one peak value is determined, so that there may be determined that one object 30 is located. However, when the measurement value for the object 30 is calculated at every detection period, there are the reception power received in the first region and the reception power received in the second region, respectively. Since this mean that there exist the measurement value in the first region and the measurement value in the second region, the plurality of objects 30 may be separately distinguished even within the angle detecting the plurality of objects 30 in the radar.

Figure 6A:
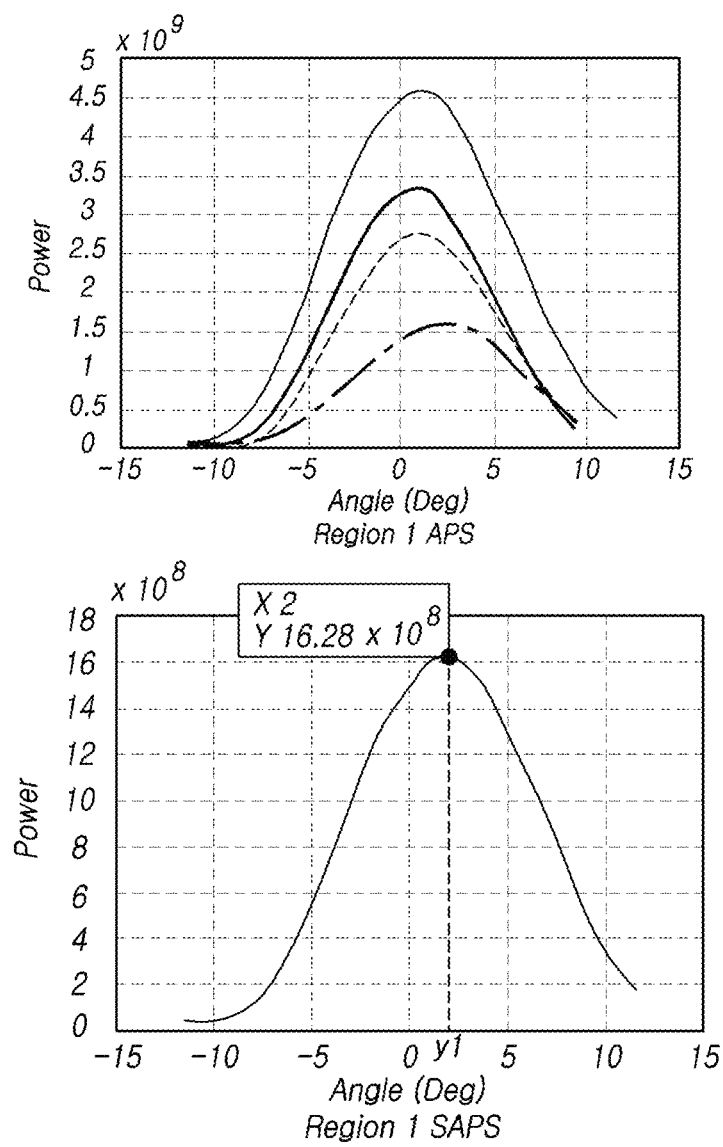
FIGS. 6A and 6B are diagrams for explaining the sum of angular power spectrum (SAPS) according to an embodiment.
Figure 6B:
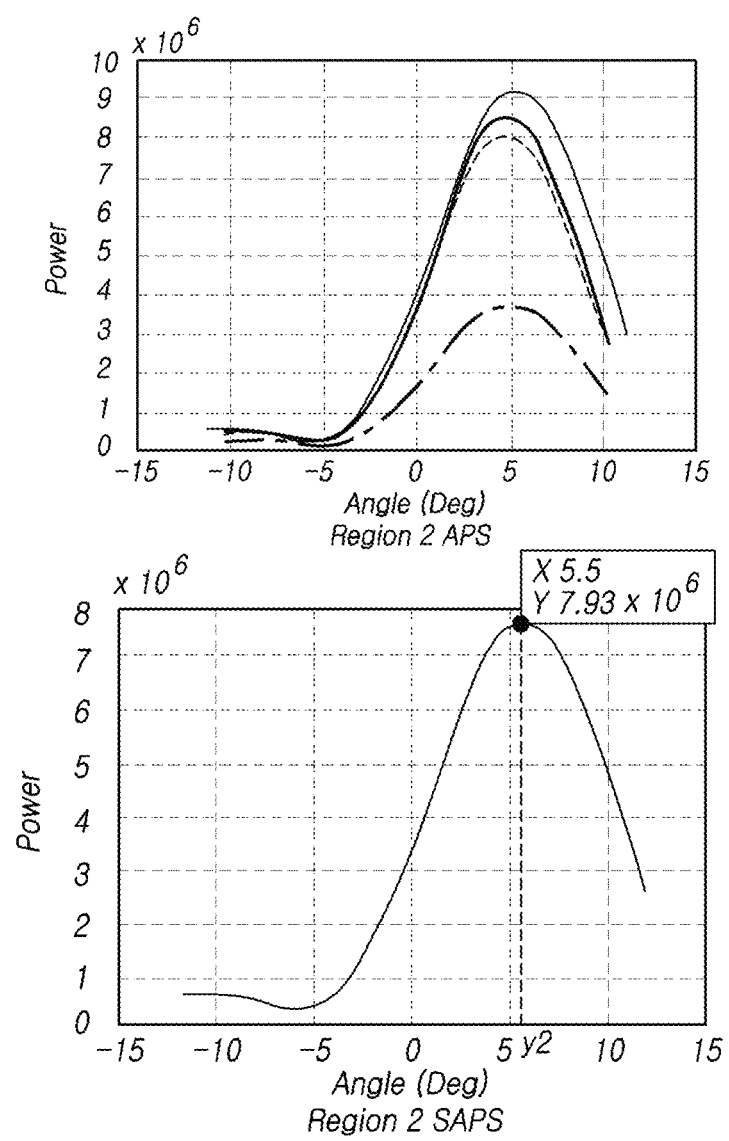

FIGS. 6A and 6B are diagrams for explaining the sum of angular power spectrum (SAPS) according to an embodiment, and FIG. 7 is a diagram for explaining classifying a plurality of objects 30 based on SAPS according to an embodiment.

The APS determiner 120 may determine a sum of angular power spectrum (SAPS) based on the APS. In addition, the object determiner 130 may determine whether there are a plurality of objects 30 based on the determined position of the measurement value determined in the SAPS.

Referring to FIGS. 6A and 6B, the APS determiner 120 may determine the SAPS obtained by summing the APSs determined for a predetermined time. Specifically, the APS determiner 120 may determine the SAPS by performing multiple scans on the radar for a predetermined time, and summing the results of determining the APS for each detection period.

As described above, since the APSs divided according to the measurement values determined in the first region and the second region are determined even within the angle at which the radar detects the plurality of objects 30, the APS determiner 120 may acquire the SAPS value determined in each region as shown in FIGS. 6A and 6B by summing the APS determined for a predetermined time. Here, if one SAPS is determined for each of the first region and the second region, the object determiner 130 may determine the position of the first measurement value of the first region, y1 of FIG. 6A, and the position of the second measurement value of the second region. y2 in FIG. 6B.

If the reception power value of any one of the above-described SAPS of the first region and the SAPS of the second region is less than a predetermined value, the object determiner 130 may determine the number of objects 30 except for the SAPS of the corresponding region. In addition, if there are a plurality of peak values detected in the SAPS, the object determiner 130 may determine that there are a plurality of objects 30.

Referring to FIG. 7, the object determiner 130 may set a first reference line and a second reference line having a predetermined interval with the host vehicle 20 on the left and right sides of the host vehicle 20, respectively. In addition, if a first peak value and a second peak value are detected in SAPS, the object determiner 130 may determine whether there are a plurality of objects 30 based on the position of the first measurement value corresponding to the first peak value and the position of the second measurement value corresponding to the second peak value. In FIG. 7, the first reference line is referred to 'a' in FIG. 7, and the second reference line is referred to 'b' in FIG. 7. In addition, the position of the first measurement value corresponding to the first peak value is y1 of FIG. 7, and the position of the second measurement value corresponding to the second peak value is y2 of FIG. 7.

Referring to FIG. 7, for example, if the position y1 of the first measurement value and the position y2 of the second measurement value are located between the first reference line and the second reference line, the object determiner 130 may determine that the object 30 is one, that is, a single object. If the position y1 of the first measurement value and the position y2 of the second measurement value are located to the left of the first reference line or to the right of the second reference line, the object determiner 130 may determine that the object 30 is a single object. If the position of the first measurement value and the position of the second measurement value are located to the right of the second reference line, the object determiner 130 may determine that there is one object 30. If the position of the first measurement value and the first reference line are located within a predetermined distance and the position of the second measurement value is located to the left of the position of the first measurement value, the object determiner 130 may determine that there are a plurality of objects 30, for example, two objects. If the position of the second measurement value and the second reference line are located within a predetermined distance and the position of the first measurement value is located to the right of the position of the second measurement value, the object determiner 130 may determine that there are a plurality of objects 30.

The radar control device 10 may be implemented as an electronic control unit (ECU) or a microcomputer.

For example, an electronic control unit (not shown) of the radar control device 10 may include at least one or more elements of one or more processors, memories, storage unit, user interface input unit and user interface output unit, which may communicate with each other via a bus. Furthermore, the electronic control unit may also comprise a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

More specifically, the radar control device 10 according to the present embodiment, and the receiver 110, the APS determiner and the object determiner 130 included therein may be implemented as a module of a control device or an ECU of a radar system mounted on a vehicle.

The control device or ECU of such a radar system may include a processor, a storage device such as a memory, and a computer program capable of performing a specific function. In addition, the receiver 110, the APS determiner and the object determiner 130 may be implemented as software modules capable of performing respective corresponding functions.

That is, the receiver 110, the APS determiner and the object determiner 130 according to the present embodiment may be implemented as respective software modules and stored in a memory, and each software module may be executed at a specific time point in an arithmetic processing unit such as an ECU included in the vehicle radar system.

Hereinafter, it will be described a radar control method using the radar control device 10 capable of performing all of the above-described present disclosure.

Figure 8:
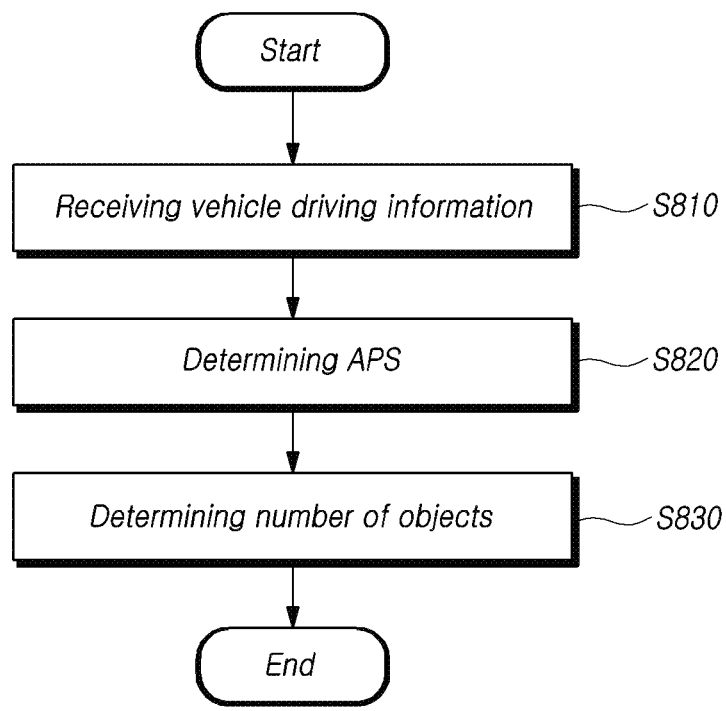
FIG. 8 is a flowchart illustrating a radar control method according to an embodiment of the present disclosure.

FIG. 8 is a flowchart illustrating a radar control method according to an embodiment of the present disclosure.

Referring to FIG. 8, a radar control method according to the present disclosure may include a information receiving step of receiving vehicle driving information about the host vehicle 20 from the radar (S810), an APS determination step of determining an angular power spectrum (APS) for a predetermined frequency based on the vehicle driving information if the object 30 is detected in the vehicle driving information (S820), and a step of determining the position of the measurement value based on the determined APS and determining whether there are a plurality of objects 30 based on the position of the measurement value (S830).

In the step S830 of determining whether there are a plurality of objects, the position corresponding to a peak value of the APS may be determined as the position of the measurement value.

In the APS determination step S820, a sum of angular power spectrum (SAPS) may be determined based on the APS, and, in the step S830, there may be determined whether there are a plurality of objects 30 based on the positions of the measurement values determined in the SAPS. Here, the SAPS may be determined as the sum of the APSs calculated for each detection period of the radar for a predetermined time.

In the step S830, there may be determined that there are a plurality of the objects 30 if there are a plurality of peak values detected in SAPS.

In the step S830 of determining whether there are a plurality of objects, a first reference line and a second reference line having a predetermined interval with the host vehicle 20 may be set on the left and right sides of the host vehicle 20, respectively. In addition, if a first peak value and a second peak value are detected in SAPS, there may be determined whether there are a plurality of objects 30 based on the position of the first measurement value corresponding to the first peak value and the position of the second measurement value corresponding to the second peak value.

In the step S830 of determining whether there are a plurality of objects, if the position of the first measurement value and the position of the second measurement value are located between the first reference line and the second reference line, there may be determined that there is one object 30 or a single object.

In the step S830 of determining whether there are a plurality of objects, if the position of the first measurement value and the position of the second measurement value are located to the left of the first reference line or to the right of the second reference line, there may be determined that there is one object 30.

In the step S830 of determining whether there are a plurality of objects, if the position of the first measurement value and the first reference line are located within a predetermined distance and the position of the second measurement value is located to the left of the position of the first measurement value, there may be determined that there are a plurality of objects 30, that is, multiple objects.

In the step S830 of determining whether there are a plurality of objects, if the position of the second measurement value and the second reference line are located within a predetermined distance and the position of the first measurement value is located to the right of the second measurement value, there may be determined that there are a plurality of objects 30, that is, multiple objects.

As described above, according to the present disclosure, the radar control device and method can recognize a plurality of objects detected at a narrow angle by determining the SAPS which is the sum of the APSs for a preset time.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar control device comprising:
a receiver for receiving vehicle driving information for a host vehicle from a radar;
an APS determiner configured to determine an angular power spectrum (APS) at a predetermined frequency based on the vehicle driving information if an object is detected in the vehicle driving information; and
an object determiner configured to determine a position of a measurement value based on the determined APS, and determine whether there are a plurality of objects based on the position of the measurement value,
wherein the APS determiner is configured to sum a plurality of APSs determined at different times for a predetermined time period to determine a sum of angular power spectrum (SAPS), and the object determiner is configured to determine whether there are the plurality of the objects based on the position of the measurement value determined in the SAPS.

2. The radar control device of claim 1, wherein the object determiner determines a position corresponding to a peak value in the APS as the position of the measurement value.

3. The radar control device of claim 1, wherein the object determiner determines that there are a plurality of objects if a number of peak values determined in the SAPS is plural.

4. A radar control device comprising:
a receiver for receiving vehicle driving information for a host vehicle from a radar;
an APS determiner configured to determine an angular power spectrum (APS) at a predetermined frequency based on the vehicle driving information if an object is detected in the vehicle driving information; and
an object determiner configured to determine a position of a measurement value based on the determined APS, and determine whether there are a plurality of objects based on the position of the measurement value,
wherein the APS determiner determines a sum of angular power spectrum (SAPS) based on the APS, and the object determiner determines whether there are a plurality of the objects based on the position of the measurement value determined in the SAPS,
wherein the object determiner sets a first reference line and a second reference line having a predetermined interval with the host vehicle on the left and right sides, respectively, with respect to the host vehicle,
wherein, if a first peak value and a second peak value are detected in the SAPS, the object determiner determines whether there are a plurality of objects based on a position of a first measurement value corresponding to the first peak value and a position of a second measurement value corresponding to the second peak value.

5. The radar control device of claim 4, wherein the object determiner determines that there is a single object if the position of the first measurement value and the position of the second measurement value are located between the first reference line and the second reference line.

6. The radar control device of claim 4, wherein the object determiner determines that there is a single object if the position of the first measurement value and the position of the second measurement value are located to the left of the first reference line or to the right of the second reference line.

7. The radar control device of claim 4, wherein the object determiner determines that there are a plurality of objects if a distance between the position of the first measurement value and the first reference line is within a predetermined distance and the position of the second measurement value is located to the left of the position of the first measurement value.

8. The radar control device of claim 4, wherein the object determiner determines that there are a plurality of objects if a distance between the position of the second measurement value and the second reference line is within a predetermined distance, and the position of the first measurement value is located to the right of the position of the second measurement value.

9. A radar control method comprising:
receiving vehicle driving information for a host vehicle from a radar;
determining an angular power spectrum (APS) at a predetermined frequency based on the vehicle driving information if an object is detected in the vehicle driving information;
determining a position of a measurement value based on the determined APS, and determining whether there are a plurality of objects based on the position of the measurement value; and summing a plurality of APSs determined at different times for a predetermined time period to determine a sum of angular power spectrum (SAPS), wherein the determining of whether there are the plurality of objects comprises determining whether there are the plurality of the objects based on the position of the measurement value determined in the SAPS.

10. The radar control method of claim 9, wherein determining whether there are a plurality of objects comprises determining a position corresponding to a peak value in the APS as the position of the measurement value.

11. The radar control method of claim 9, wherein determining whether there are a plurality of objects comprises determining that there are a plurality of objects if a number of peak values determined in the SAPS is plural.

12. A radar control method comprising:

receiving vehicle driving information for a host vehicle from a radar;

determining an angular power spectrum (APS) at a predetermined frequency based on the vehicle driving information if an object is detected in the vehicle driving information; and determining a position of a measurement value based on the determined APS, and determining whether there are a plurality of objects based on the position of the measurement value, wherein determining the APS comprises determining a sum of angular power spectrum (SAPS) based on the APS, and determining whether there are a plurality of objects comprises determining whether there are a plurality of the objects based on the position of the measurement value determined in the SAPS, wherein determining whether there are a plurality of objects comprises:

setting a first reference line and a second reference line having a predetermined interval with the host vehicle on the left and right sides, respectively, with respect to the host vehicle, and if a first peak value and a second peak value are detected in the SAPS, determining whether there are a plurality of objects based on a position of a first measurement value corresponding to the first peak value and a position of a second measurement value corresponding to the second peak value.

13. The radar control method of claim 12, wherein determining whether there are a plurality of objects comprises determining that there is a single object if the position of the first measurement value and the position of the second measurement value are located between the first reference line and the second reference line.

14. The radar control method of claim 12, wherein determining whether there are a plurality of objects comprises determining that there is a single object if the position of the first measurement value and the position of the second measurement value are located to the left of the first reference line or to the right of the second reference line.

15. The radar control method of claim 12, wherein determining whether there are a plurality of objects comprises determining that there are a plurality of objects if a distance between the position of the first measurement value and the first reference line is within a predetermined distance and the position of the second measurement value is located to the left of the position of the first measurement value.

16. The radar control method of claim 12, wherein determining whether there are a plurality of objects comprises determining that there are a plurality of objects if a distance between the position of the second measurement value and the second reference line is within a predetermined distance, and the position of the first measurement value is located to the right of the position of the second measurement value.

* * * * *